(12) United States Patent
Liao (10) Patent No.: US 7,303,668 B2
(45) Date of Patent: Dec. 4, 2007

(54) FILTERING DEVICE

(76) Inventor: Chin-Tuan Liao, No. 29, Hwa-Yan St., Pingtung County, Chao-Zhou (TW)

( * ) Notice: Subject to any disclaimer, the term of this patent is extended or adjusted under 35 U.S.C. 154(b) by 20 days.

(21) Appl. No.: 11/306,228

(22) Filed: Dec. 20, 2005

(65) Prior Publication Data
US 2006/0260991 A1 Nov. 23, 2006

(30) Foreign Application Priority Data
May 23, 2005 (TW) .............................. 94208402 U
Oct. 20, 2005 (TW) .............................. 94218167 U (51) Int. Cl.
*C02F 3/10* (2006.01)
(52) U.S. Cl. .................. 210/150; 210/503; 261/94; 261/DIG. 72; 428/131; 428/402
(58) Field of Classification Search ............... 210/150, 210/151, 263, 503; 261/DIG. 72, 94; 428/131, 428/137, 402
See application file for complete search history.

(56) References Cited

U.S. PATENT DOCUMENTS

| | | | |
|---|---|---|---|
| 3,429,654 A * | 2/1969 | Friedrichsen et al. | 261/DIG. 72 |
| 3,543,937 A * | 12/1970 | Choun | 210/150 |
| 3,758,087 A * | 9/1973 | Hoon, Jr. | 261/94 |
| 3,823,924 A * | 7/1974 | Hoon, Jr. | 261/94 |
| 4,113,810 A * | 9/1978 | Ikawa | 261/DIG. 72 |
| 4,200,532 A * | 4/1980 | Iwatani et al. | 210/151 |
| 4,208,284 A * | 6/1980 | Pretorius et al. | 261/DIG. 72 |
| 4,581,299 A * | 4/1986 | Jager | 261/DIG. 72 |
| 5,223,129 A * | 6/1993 | Hsieh | 210/150 |
| 5,690,819 A * | 11/1997 | Chianh | 210/150 |

FOREIGN PATENT DOCUMENTS

JP     55-145589     * 11/1980

OTHER PUBLICATIONS

Translation of Japanese patent 55-145589, Nov. 1980.*

* cited by examiner

*Primary Examiner*—Christopher Upton
(74) *Attorney, Agent, or Firm*—Alan Kamrath; Kamrath & Associates PA (57) ABSTRACT

A filtering device includes a hollow casing and a plurality of tubes. The casing includes an interior defined by a surrounding wall. The casing further includes a plurality of through-holes defined in the surrounding wall and in communication with the interior of the casing. Each tube extends through an associated one of the through-holes of the casing into the interior of the casing. In another embodiment, a filtering device includes a first hollow casing and a second hollow casing received in the first hollow casing. Each of the first hollow casing and the second hollow casing includes an interior delimited by a surrounding wall. A plurality of through-holes are defined in each of the surrounding walls of the first hollow casing and the second hollow casing.

13 Claims, 14 Drawing Sheets

FILTERING DEVICE

BACKGROUND OF THE INVENTION

1. Field of the Invention

The present invention relates to a filtering device. More particularly, the present invention relates to a filtering device for purifying water and removing oil, grease, or smoke containing oil.

2. Description of the Related Art

In the field of filtration of waste water in a septic tank, cultivating pool, etc, it is well known to use nitrobacteria to decompose organic nitrogen into ammonia, which is then oxidized into nitrate that is less toxic. The amount of organic nitrogen contained in the discharged water is reduced to achieve the purification purposes by the "biofiltration" process.

The nitrobacteria are adhesive bacteria requiring a sufficient space for propagation. The decayed and deposited sludge in a septic tank provides an environment for growth and propagation of the nitrobacteria. For purification of the waste water in the septic tank, a stirring device or pump is mounted in the septic tank for stirring or recycling the sludge, providing re-filtering and/or re-decomposition effect. However, the stirring or recycling procedure would destroy the environment for the nitrobacteria, as the sludge could not effectively gather and deposit.

Smoke and waste water discharged from the kitchen often contain oil and grease that are detrimental to the environmental hygiene and cause pollution to water. Removal of the smoke and waste water before discharge is required.

SUMMARY OF THE INVENTION

In accordance with an aspect of the present invention, a filtering device comprises a hollow casing and a plurality of tubes. The casing comprises an interior defined by a surrounding wall. The casing further comprises a plurality of through-holes defined in the surrounding wall and in communication with the interior of the casing. Each tube extends through an associated one of the through-holes of the casing into the interior of the casing.

In an embodiment, each tube comprises a main body and a flange on an end of the main body. The flange is retained on the surrounding wall of the casing. Preferably, the flange has an outer diameter greater than that of each through-hole of the casing.

In another embodiment, each tube integrally extends inward from a circumference delimiting the associated one of the through-holes of the casing.

The casing may be spherical.

The filtering device may further comprise at least one connecting member for connecting the filtering device to another similarly constructed filtering device.

Preferably, the connecting member comprises two coupling sections respectively extended into one of the through-holes of the filtering device and one of the through-holes of another similarly constructed filtering device.

Preferably, the connecting member comprises a flange section between the coupling sections. The flange section has an outer diameter greater than the diameter of each through-hole of the filtering device.

Preferably, the connecting member is tubular.

Preferably, each coupling section comprises an engaging portion with an annular groove for receiving a circumference delimiting the associated one of the through-holes of the filtering device or another similarly constructed filtering device.

In accordance with another aspect of the present invention, a filtering device comprises a first hollow casing and a second hollow casing received in the first hollow casing. Each of the first hollow casing and the second hollow casing comprises an interior delimited by a surrounding wall. A plurality of through-holes are defined in each of the surrounding walls of the first hollow casing and the second hollow casing.

In an embodiment, the first hollow casing further comprises a plurality of tubes. Each tube integrally extends inward from a circumference delimiting an associated one of the through-holes of the first hollow casing. The second hollow casing further comprises a plurality of tubes. Each tube integrally extends inward from a circumference delimiting an associated one of the through-holes of the second hollow casing.

The filtering device in accordance with the present invention can be used in a septic tank, an exhaust pipe of a vehicle, or in a piping to provide an environment for nitrobacteria or other bacteria, oil, grease, or smoke to adhere for improving the filtering effect for waste water and exhaust-gas.

Other objectives, advantages, and novel features of the invention will become more apparent from the following detailed description when taken in conjunction with the accompanying drawings.

DETAILED DESCRIPTION OF THE PREFERRED EMBODIMENTS

Figure 1:
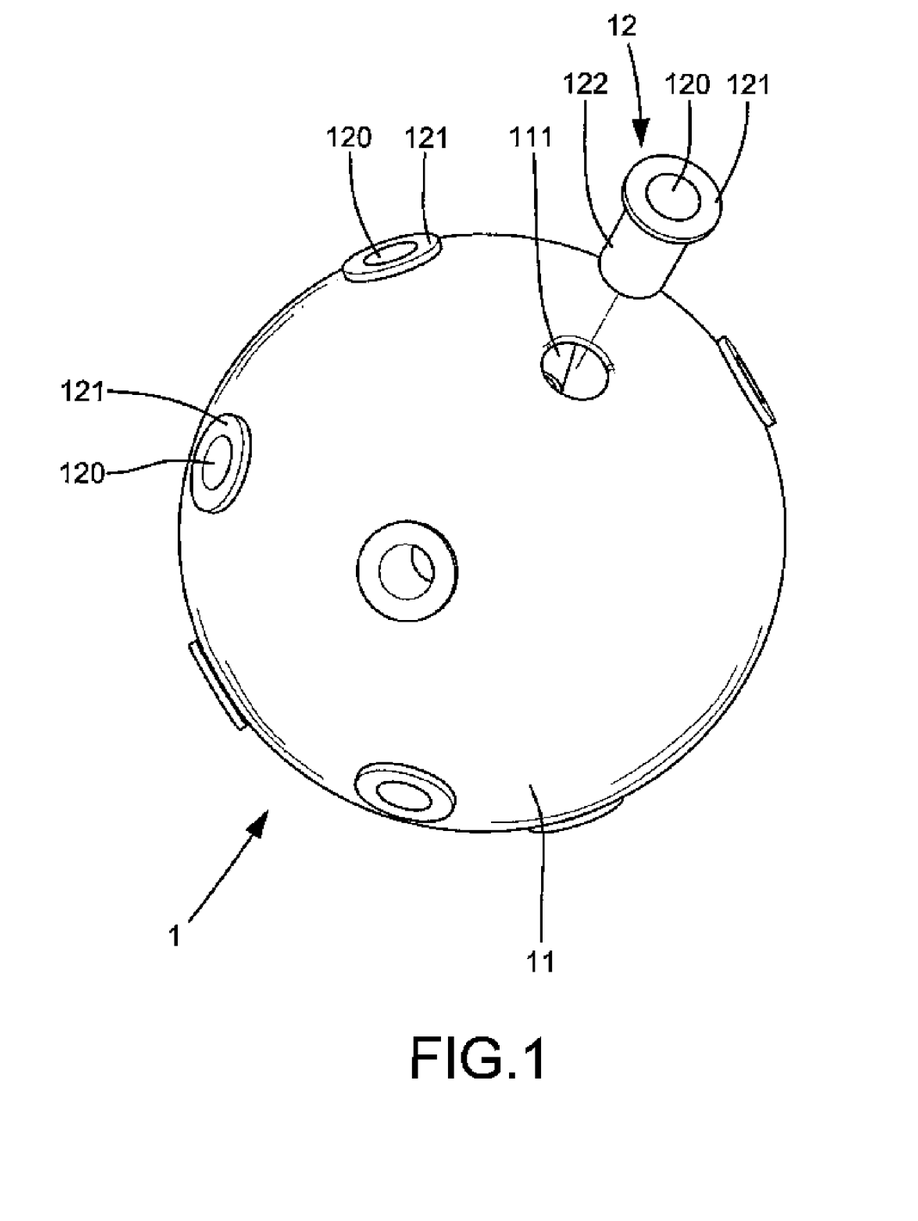
FIG. 1 is a perspective view, partly exploded, of a first embodiment of a filtering device in accordance with the present invention.
Figure 2:
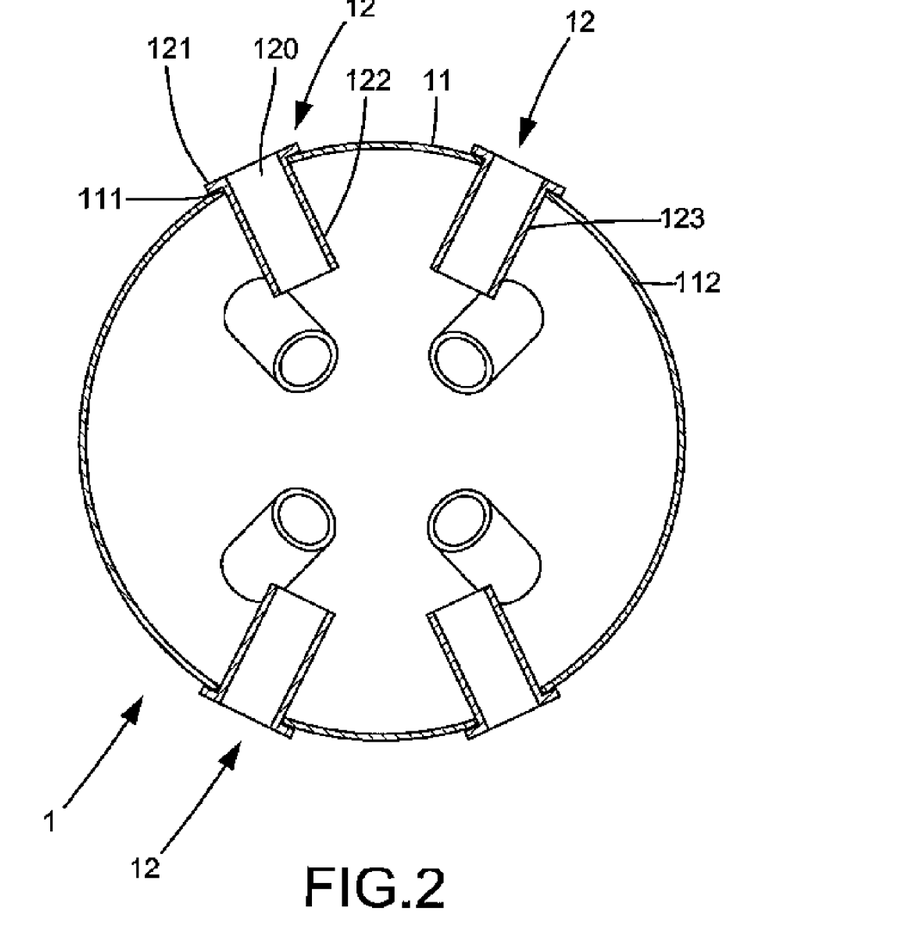
FIG. 2 is a sectional view of the filtering device in FIG. 1.

FIG. 1 shows a first embodiment of a filtering device in accordance with the present invention and FIG. 2 is a sectional view of the filtering device in FIG. 1.

The filtering device 1 comprises a hollow casing 11 that may be spherical, cubic, or polyhedral. In this example, the casing 11 is spherical. Preferably, the casing 11 is made of a material having a small density such as plastic or foam material so that the casing 11 floats on water.

The casing 11 comprises an interior defined by a surrounding wall. A plurality of through-holes 111 are defined in the surrounding wall and in communication with an interior of the casing 11. A tube 12 is mounted in each through-hole 111. Each tube 12 includes a main body 122 and a flange 121 on an outer end of the main body 122. The main body 122 has an outer diameter substantially the same as a diameter of the through-hole 111 where as the flange 121 has an outer diameter greater than the diameter of the through-hole 111. Thus, the main body 122 of each tube 12 can be tightly inserted into the interior of the casing 11, with the flange 121 retained on a spherical outer surface of the casing 11. It is noted that each tube 12 has a through-hole 120 that allows the interior of the casing 11 to be in communication with outside. The main body 122 of each tube 12 further includes an outer surface 123.

Referring to FIG. 2, the outer surface 123 of the main body 122 of each tube 12 and the inner surface 112 of the casing 11 provide a relatively large area for impurities to adhere, forming a space suitable for growth and propagation of bacteria such as nitrobacteria for providing biofiltration to waste water, thereby purifying water.

Figure 3:
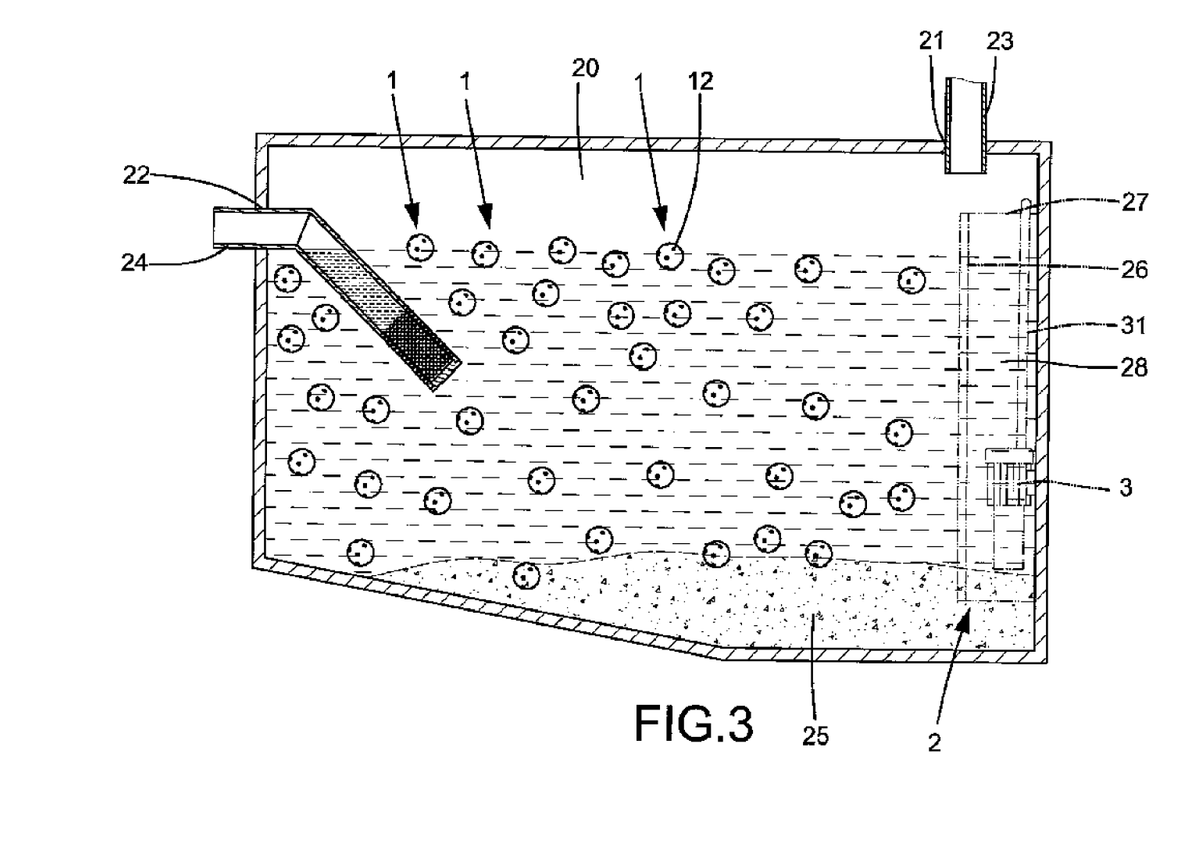
FIG. 3 is a perspective view of a septic tank using the filtering devices in FIG. 1.

Referring to FIG. 3, a plurality of the filtering devices 1 can be placed into a septic tank 2. The septic tank 2 comprises a chamber 20, a waste water inlet 21 to which an inlet pipe 23 is mounted, and a waste water outlet 22 to which an outlet pipe 24 is mounted. Household waste water (including waste water containing feces discharged from the toilets) enters the chamber 20 via the inlet pipe 23. Decomposed and decayed solids deposit at the bottom of the chamber 20 and thus become sludge 25.

A partitioning plate 26 is mounted in the chamber 20 adjacent to the inlet 21, defining a recycling subchamber 27. A submersible pump 3 is mounted in the recycling subchamber 27 and a recycling pipe 31 is connected to the submersible pump 3. When the submersible pump 3 operates, the sludge 25 in the chamber 20 is stirred and flows back into the recycling subchamber 27 via the recycling pipe 31 for re-filtration purposes. Since the sludge 25 is stirred, the environment for growth and propagation of the nitrobacteria is destroyed, yet this problem is solved by the filtering device 1 in accordance with the present invention.

Referring to FIGS. 2 and 3, when the filtering devices 1 in accordance with the present invention are put into the chamber 20 of the septic tank 2, the filtering devices 1 floats on the waste water 28 in the chamber 20. When the waste water flows through the through-holes 120 of the tubes 12 into the casing 11 of each filtering device, due to the arrangement of the extending directions of the main bodies 122 of the tubes 12 relative to the inner surface 112 of the casing 11 in each filtering device 1, the impurities in the waste water are apt to adhere to the outer surface 123 of the main body 122 of each tube 12 and the inner surface 112 of the casing 11, providing an environment suitable for growth and propagation of nitrobacteria. Thus, the biofiltrating effect is improved and the water quality is assured. The amount of organic nitrogen contained in the waste water discharged from the outlet pipe 24 is reduced.

Of course, the filtering devices 1 may be submerged in the waste water 28 in the chamber 20 and achieve the required filtering function while providing an environment for growth and propagation of the nitrobacteria.

Figure 4:
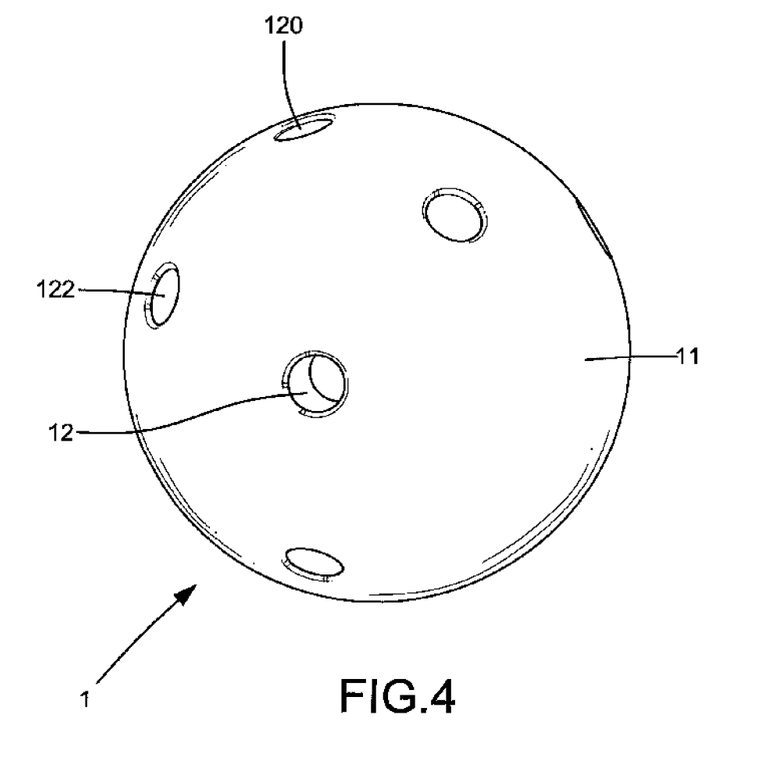
FIG. 4 is a perspective view of a second embodiment of the filtering device in accordance with the present invention.
Figure 5:
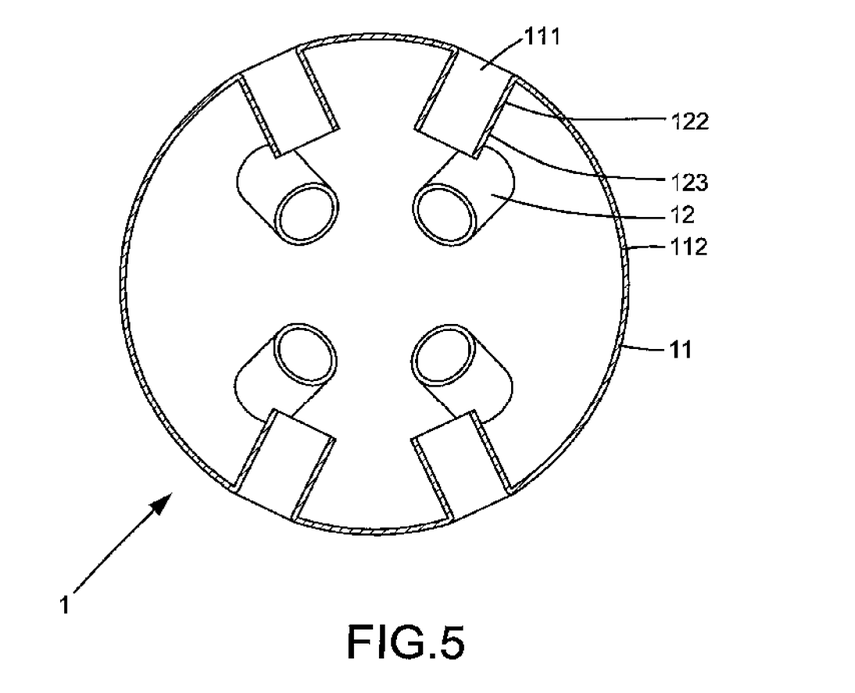
FIG. 5 is a sectional view of the filtering device in FIG. 4.

FIGS. 4 and 5 illustrate a second embodiment of the filtering device in accordance with the present invention. In this embodiment, each tube 12 is integrally formed with the casing 11. In other words, the main body 122 of each tube 12 integrally extends inward from a circumference delimiting an associated through-hole 111 of the casing 11 to an appropriate length. The flange 121 on the outer end of the main body 122 of each tube 11 is omitted.

Figure 6:
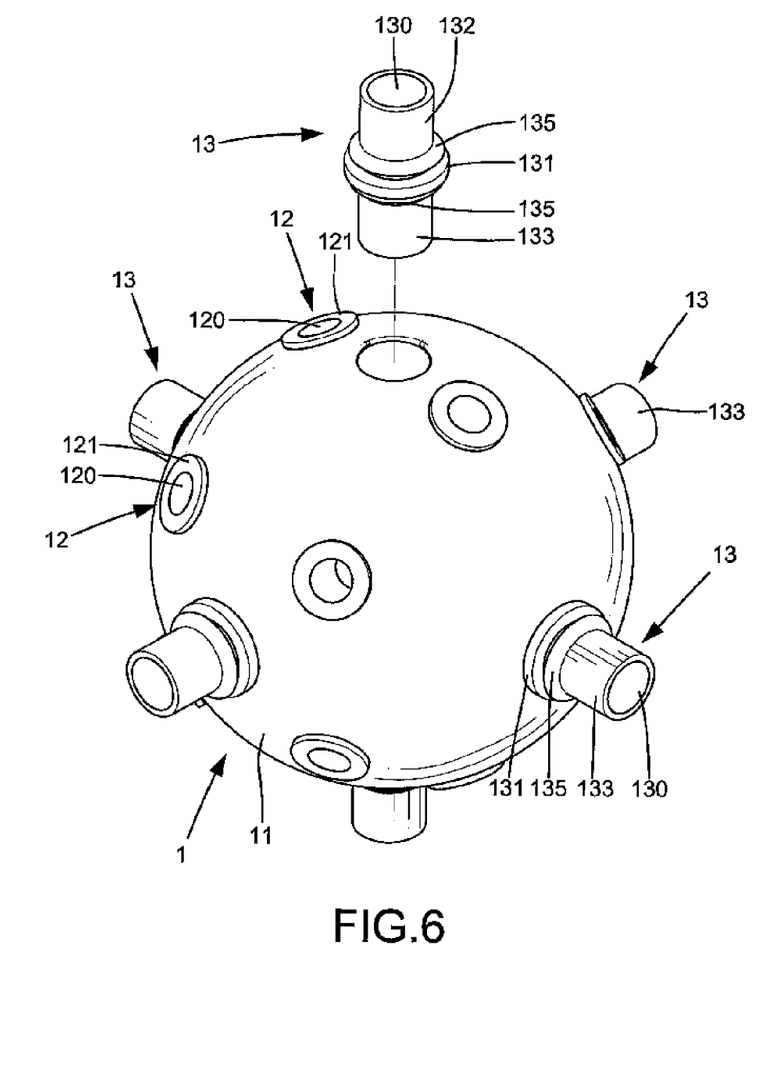
FIG. 6 is an exploded perspective view, partly exploded, of a third embodiment of the filtering device in accordance with the present invention.
Figure 7:
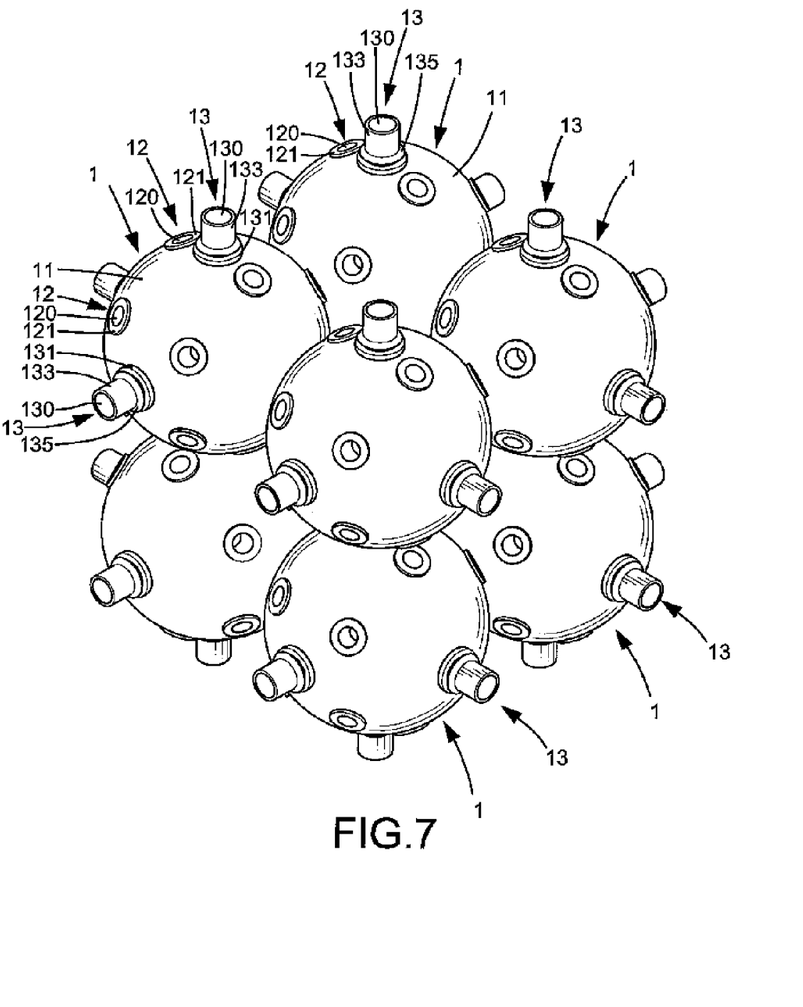
FIG. 7 is a perspective view illustrating a filtering assembly formed by a plurality of filtering devices in FIG. 6.
Figure 8:
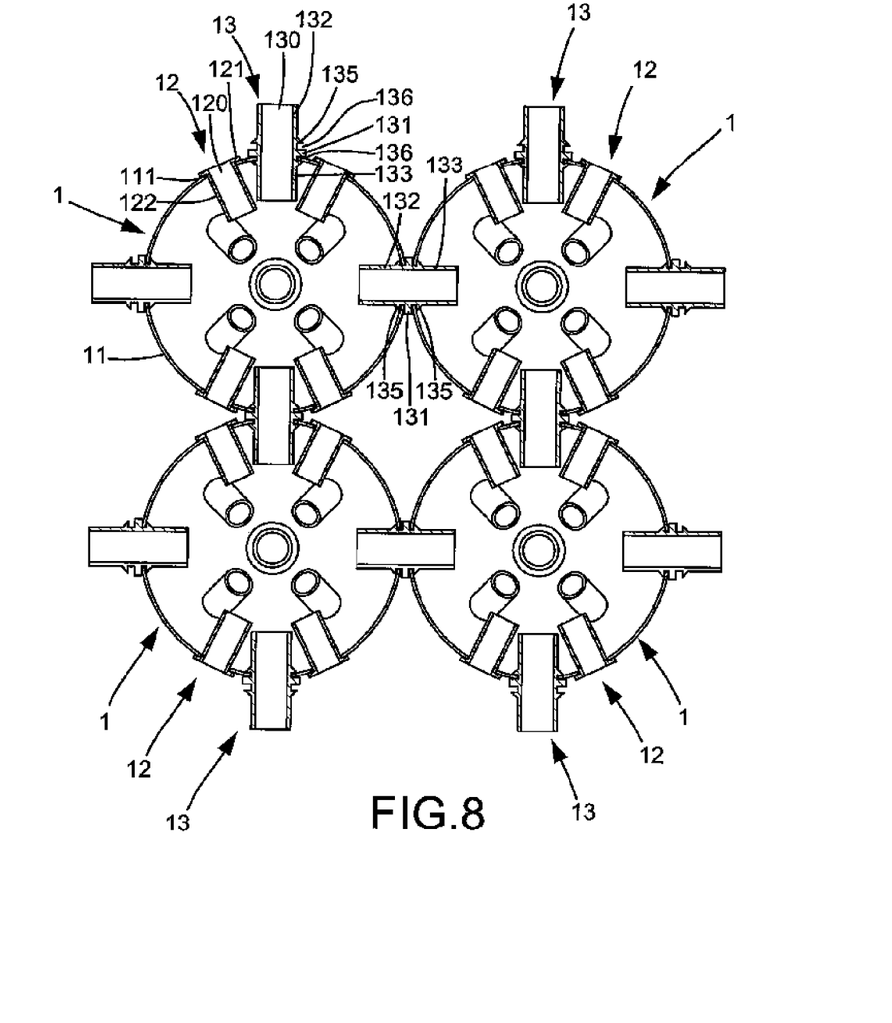
FIG. 8 is a sectional view of the filtering assembly in FIG. 7.

FIGS. 6 through 8 illustrate a third embodiment of the invention, wherein the filtering device 1 further comprises a plurality connecting members 13. Preferably, each connecting member 13 is a tubular member having a through-hole 130. Further, each connecting member 13 comprises a flange section 131 and two coupling sections 132 and 133 respectively extending from two sides of the flange section 131. Each coupling section 132, 133 has an outer diameter substantially the same as the diameter of the through-hole 111. The connecting members 13 can be used to connect two or more filtering devices 1 together to form a filtering assembly. This may provide a larger area for adherence of nitrobacteria and impurities, further improving the filtering effect.

In FIG. 7, eight filtering devices 1 are connected together by the connecting members 3. As illustrated in FIG. 8, one of the coupling sections 132 and 133 of each connecting member 3 is extended into a through-hole 11 of a casing 11, and the other coupling section 132 or 133 of the connecting member 3 is extended into a through-hole 11 of another casing 11, thereby connecting the two casings 11 together. As many as filtering devices 1 can be connected together by the connecting members 3. Each coupling section 132, 133 of each connecting member 13 may include an engaging portion 135 with an annular groove 136 for receiving the circumference delimiting the associated through-hole 111 of the casing 11.

The coupling sections 132 and 133 of the connecting members 13 are hollow and thus provide a larger area for adherence of the nitrobacteria and impurities. The extending directions of the tubes 12 and the coupling sections 132 and 133 of the connecting members 13 also contribute to the adherence of the nitrobacteria and impurities.

Figure 9:
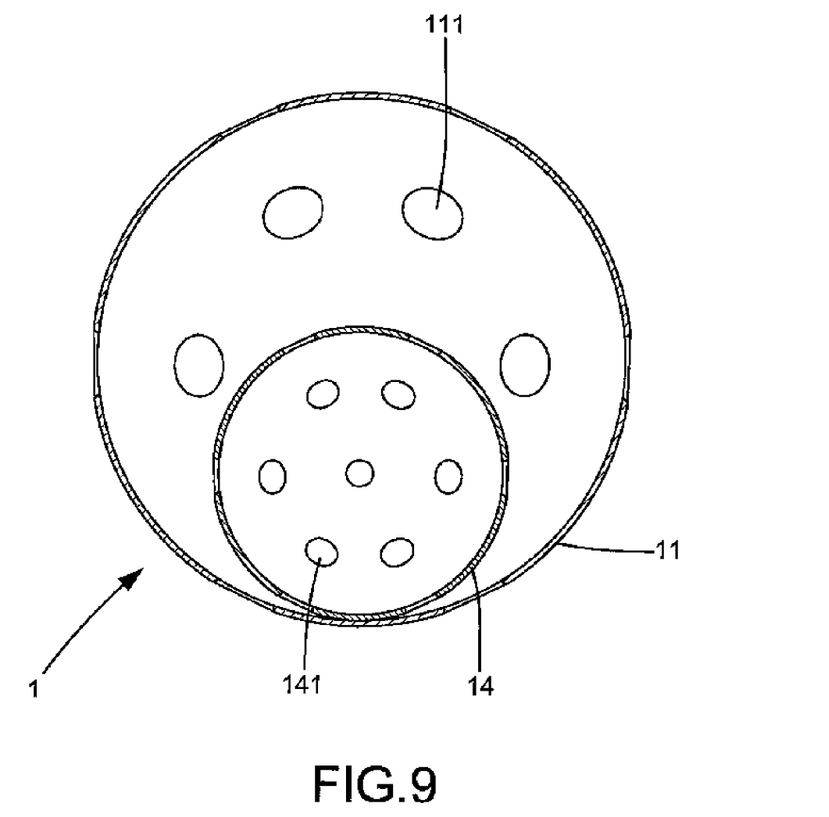
FIG. 9 is a sectional view of a fourth embodiment of the filtering device in accordance with the present invention.

FIG. 9 illustrates a fourth embodiment of the invention, wherein the filtering device 1 comprises a first, larger hollow casing 11 and a second, smaller hollow casing 14 received in the first casing 11. Each of the first hollow casing 11 and the second hollow casing 14 comprises a plurality of through-holes 111, 141 in a spherical wall thereof.

Figure 10:
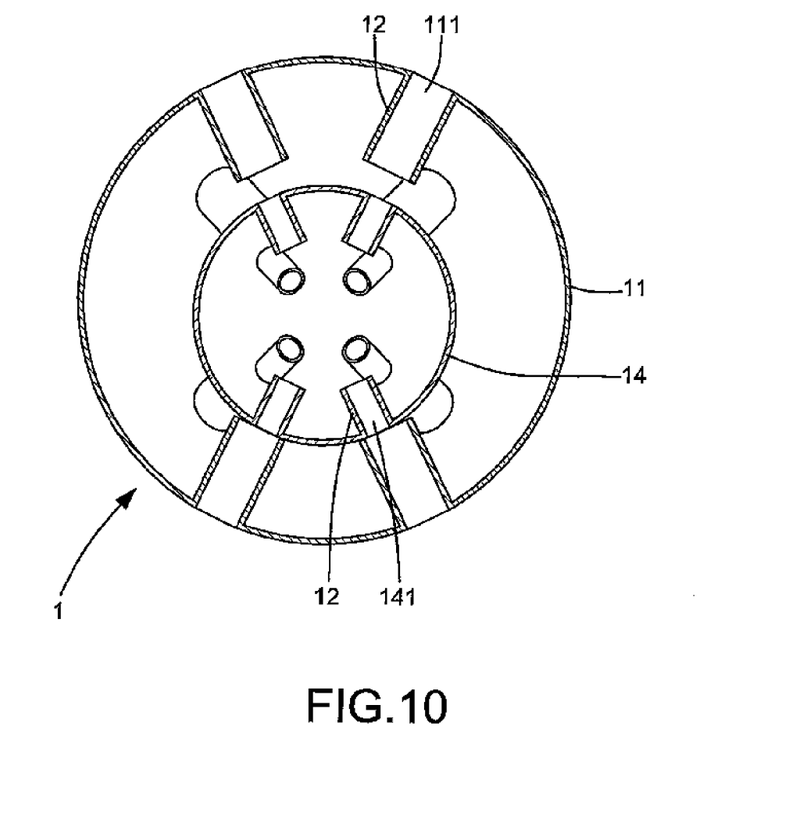
FIG. 10 is a sectional view of a fifth embodiment of the filtering device in accordance with the present invention.

FIG. 10 illustrates a fifth embodiment of the invention modified from the fourth embodiment, wherein each of the first hollow casing 11 and the second hollow casing 14 comprises a plurality of integrally formed tubes 12. In other words, a tube 12 integrally extends inward from a circumference delimiting an associated one of the through-holes 111 and 141 of the first hollow casing 11 and the second hollow casing 14. The tubes 12 in the first hollow casing 11 or the tubes 12 in the second hollow casing 14 can be omitted.

Figure 11:
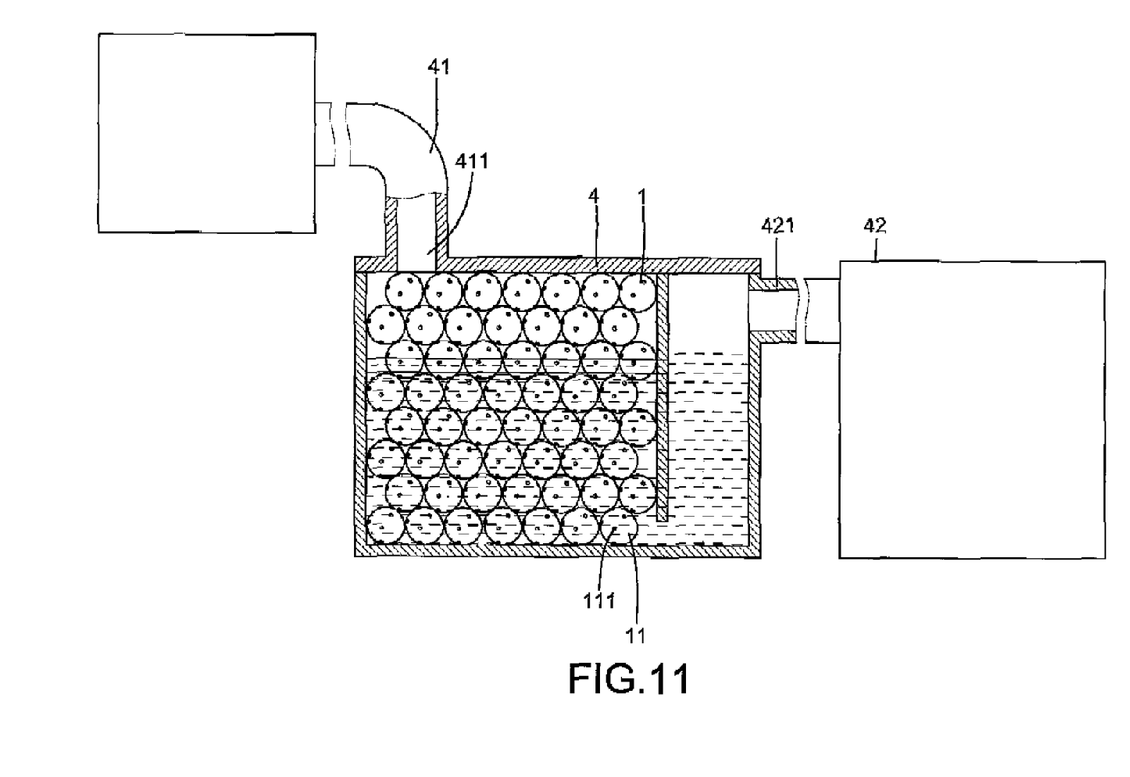
FIG. 11 is a schematic sectional view illustrating use of the filtering devices in accordance with the present invention in separating oil from water.
Figure 12:
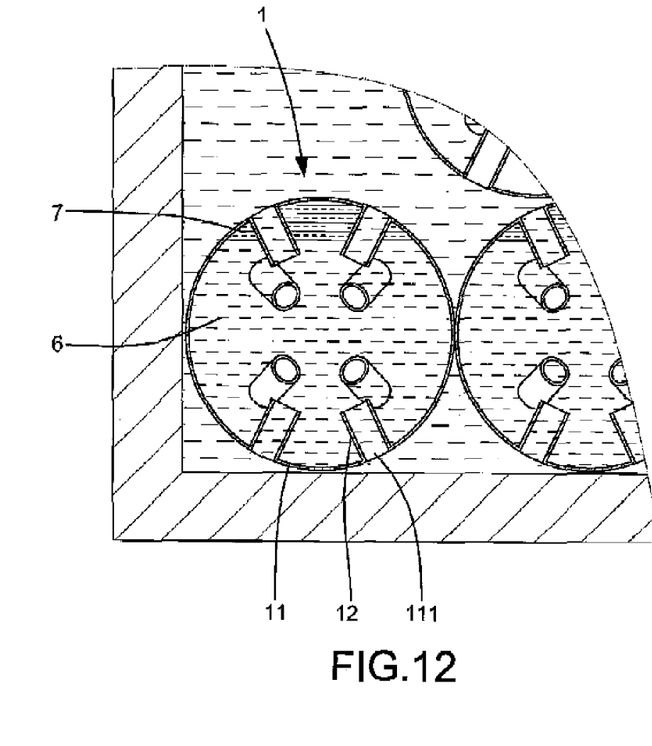
FIG. 12 is an enlarged sectional view illustrating separation of oil from water.

FIGS. 11 and 12 illustrate use of the filtering devices 1 in accordance with the present invention in a tank 4 for separating oil from water. The tank 4 is mounted between a waste water tube 41 in a kitchen and a waste water treatment tank 42. When waste water 6 from kitchen flows into the tank 4 via an outlet 411 of the waste water tube 41, the waste water 6 flows into the respective filtering devices 1 via the tubes 12. Lighter grease 7 in the waste water 6 floats to an upper portion in the interior of each casing 11 (see FIG. 12). Thus, grease 7 is separated from the waste water, and the waste water is discharged via an outlet 421 to the waste water treatment tank 42. A purification effect is obtained.

Figure 13:
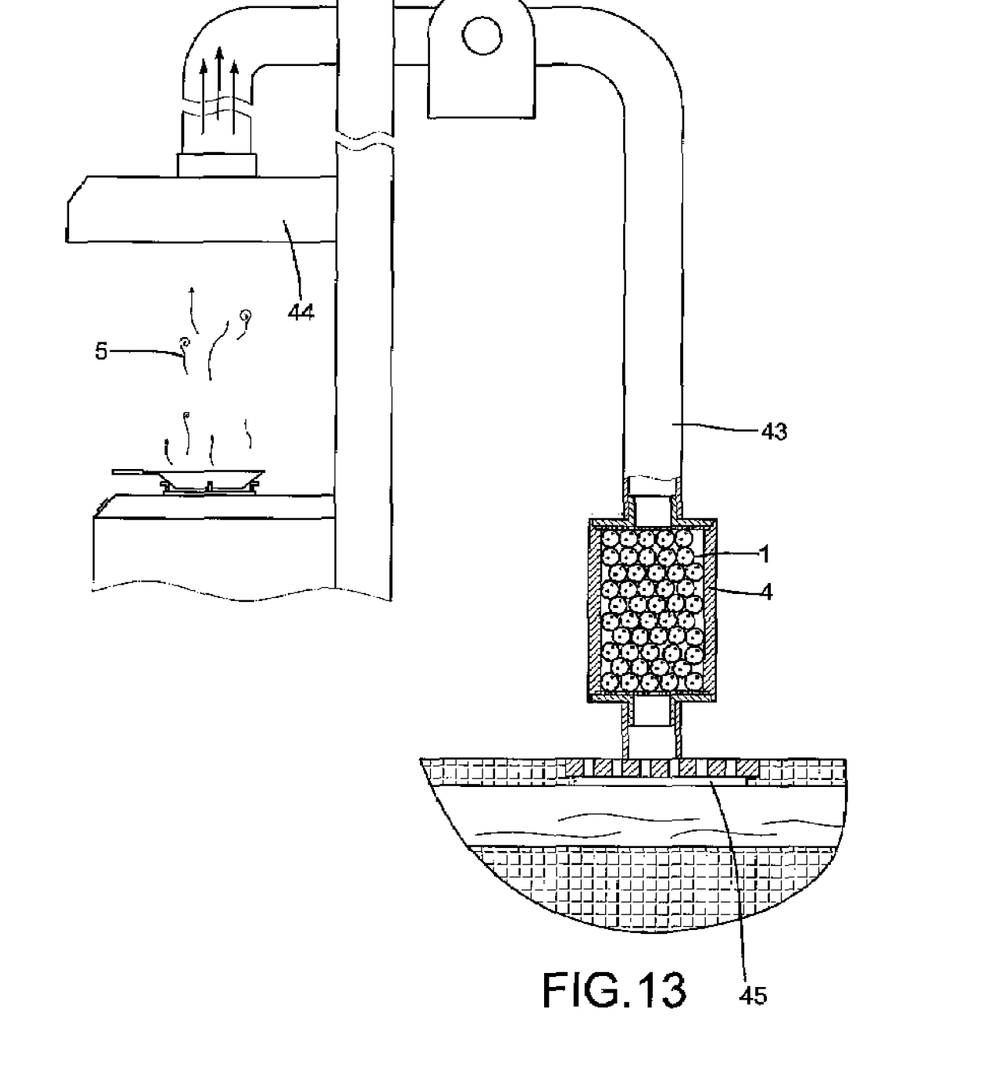
FIG. 13 is a schematic sectional view illustrating use of the filtering devices in accordance with the present invention in filtration of smoke.

FIG. 13 illustrates use of the filtering devices 1 in filtration of smoke. The filtering devices 1 are filled into a tank 4 and mounted to an end of a smoke exhaust pipe 43 in a kitchen. Smoke 5 resulting from cooking is discharged by a smoke exhauster 44 to the smoke exhaust pipe 43 and thus led into the tank 4 filled with the filtering devices 1 in accordance with the present invention. Oil and/or impurities in the smoke adhere to the outer surfaces 123 of the main bodies 122 of the tubes 12 and the inner surfaces 112 of the casings 11 (and the inner surfaces of the casings 14, if the filtering devices of the type shown in FIG. 9 are used). This is owing to the large surface area in the casings 11 (and casings 14, if the filtering devices of the type shown in FIG. 9 are used) and the extending directions of the tubes 122. A filtering effect is obtained, and the waste gas discharged to the discharge pipe 45 is purified.

Figure 14:
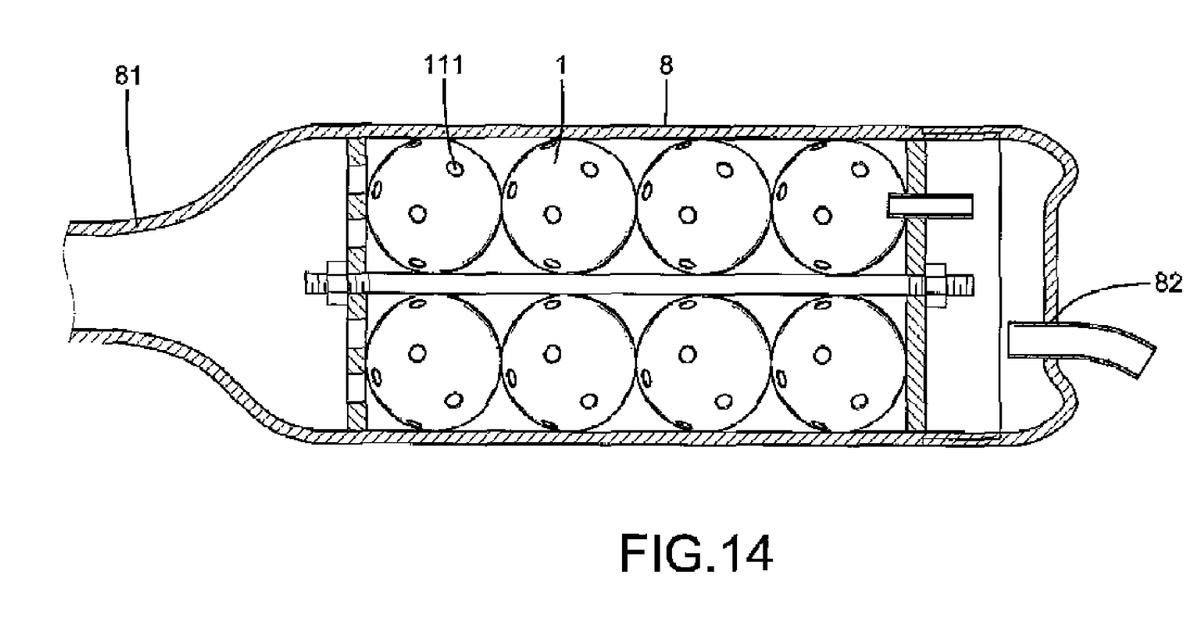
FIG. 14 is a schematic sectional view illustrating use of the filtering devices in accordance with the present invention in an exhaust pipe of a vehicle.

FIG. 14 illustrates use of the filtering devices 1 in an exhaust pipe 8 of a vehicle. The filtering devices 1 shown in any one of the embodiments of the invention are filled into the exhaust pipe 8 of the vehicle. Exhaust-gas from an inlet 81 of the exhaust pipe 8 enters the filtering devices 1 and thus filtered, as a portion of oil and smoke in the exhaust-gas adheres to the outer surfaces 123 of the main bodies 122 of the tubes 12 and the inner surfaces 112 of the casings 11 (and the casings 14, if the filtering devices of the type shown in FIG. 9 are used). After filtration, exhaust-gas is discharged via an outlet 82 of the exhaust pipe 8. Further, the feedback pressure is reduced, and the exhaust operation is smoother.

The filtering device in accordance with the present invention can be used to provide an environment for nitrobacteria or other bacteria, oil, grease, or smoke to adhere for improving the filtering effect for waste water and exhaust-gas. The organic substances contained in the waste water flowing to the waste water treatment tank can be reduced. The environmental hygiene and water quality are less adversely affected by the household waste water and vehicle exhaust-gas. Further, the organic oil adhered to the filtering device in accordance with the present invention can be recycled for cultivating purposes or used as fertilizers.

Although specific embodiments have been illustrated and described, numerous modifications and variations are still possible without departing from the essence of the invention. The scope of the invention is limited by the accompanying claims.

What is claimed is:

1. A filtering device comprising:
   a hollow casing comprising an interior defined by a surrounding wall, the casing further comprising a plurality of through-holes defined in the surrounding wall and in communication with the interior of the casing; and
   a plurality of tubes each extending through an associated one of the through-holes of the casing into the interior of the casing.

2. The filtering device as claimed in claim 1, with each said tube comprising a main body and a flange on an end of the main body, the flange being retained on the surrounding wall of the casing.

3. The filtering device as claimed in claim 2, with the flange having an outer diameter greater than that of each said through-hole of the casing.

4. The filtering device as claimed in claim 1, with each said tube integrally extending inward from a circumference delimiting the associated one of the through-holes of the casing.

5. The filtering device as claimed in claim 1, with the casing being spherical.

6. The filtering device as claimed in claim 1, with the filtering device further comprising at least one connecting member for connecting the filtering device to another similarly constructed filtering device.

7. The filtering device as claimed in claim 6, with said at least one connecting member comprising two coupling sections respectively extended into one of the through-holes of the filtering device and one of the through-holes of said another similarly constructed filtering device.

8. The filtering device as claimed in claim 7, with said at least one connecting member comprising a flange section between the coupling sections, the flange section having an outer diameter greater than the diameter of each said through-hole of the filtering device.

9. The filtering device as claimed in claim 7, with said at least one connecting member being tubular.

10. The filtering device as claimed in claim 7, with each said coupling section comprising an engaging portion with an annular groove for receiving a circumference delimiting the associated one of the through-holes of the filtering device or said another similarly constructed filtering device.

11. A filtering device comprising a first hollow casing and a second hollow casing received in the first hollow casing, each of the first hollow casing and the second hollow casing comprising an interior delimited by a surrounding wall, a plurality of through-holes being defined in each of the surrounding walls of the first hollow casing and the second hollow casing, with the first hollow casing further comprising a plurality of tubes, with each said tube integrally extending inward from a circumference delimiting an associated one of the through-holes of the first hollow casing.

12. The filtering device as claimed in claim 11, with the second hollow casing further comprising a plurality of tubes of the second hollow casing, with each said tube integrally extending inward from a circumference delimiting an associated one of the through-holes of the second hollow casing.

13. A filtering device comprising a first hollow casing and a second hollow casing received in the first hollow casing, each of the first hollow casing and the second hollow casing comprising an interior delimited by a surrounding wall, a plurality of through-holes being defined in each of the surrounding walls of the first hollow casing and the second hollow casing, with the second hollow casing further comprising a plurality of tubes, with each said tube integrally extending inward from a circumference delimiting an associated one of the through-holes of the second hollow casing.

* * * * *